US007426738B2

(12) United States Patent
Deverill et al.

(10) Patent No.: US 7,426,738 B2
(45) **Date of Patent: *Sep. 16, 2008**

(54) COMPUTER SYSTEM PERFORMANCE MONITORING USING TRANSACTION LATENCY DATA

(75) Inventors: Ian J. Deverill, Maidstone (GB); Safe E. Hammad, London (GB); Alex D. Hassan, Harpenden (GB); Warren P. Finnerty, Plainfield, NJ (US)

(73) Assignee: Goldman, Sachs & Co., New York, NY (US)

( * ) Notice: Subject to any disclaimer, the term of this patent is extended or adjusted under 35 U.S.C. 154(b) by 92 days.

This patent is subject to a terminal disclaimer.

(21) Appl. No.: 11/389,622

(22) Filed: Mar. 24, 2006

(65) Prior Publication Data

US 2006/0168594 A1 Jul. 27, 2006

Related U.S. Application Data

(63) Continuation of application No. 09/896,854, filed on Jun. 29, 2001, now Pat. No. 7,051,339.

(51) Int. Cl.

| | |
|---|---|
| ***G06F 15/16*** | (2006.01) |
| *G06F 15/173* | (2006.01) |
| *G06F 15/177* | (2006.01) |

(52) U.S. Cl. ........................ 719/328; 709/223; 709/202

(58) Field of Classification Search ................ 719/310, 719/328, 313–318; 709/200–203, 217–227; 705/65, 75, 11, 22; 718/100, 101; 902/22; 714/38, 47; 700/32, 91; 702/182; 715/736

See application file for complete search history.

(56) References Cited

U.S. PATENT DOCUMENTS

| | | | | |
|---|---|---|---|---|
| 6,041,352 | A | 3/2000 | Burdick et al. | |
| 6,108,700 | A * | 8/2000 | Maccabee et al. | 709/224 |
| 6,144,961 | A | 11/2000 | de la Salle | |
| 6,633,908 | B1 * | 10/2003 | Leymann et al. | 709/224 |
| 6,757,689 | B2 * | 6/2004 | Battas et al. | 707/101 |
| 7,139,844 | B2 * | 11/2006 | Smith et al. | 709/250 |
| 7,284,048 | B2 * | 10/2007 | Jakobson et al. | 709/224 |
| 7,290,056 | B1 * | 10/2007 | McLaughlin, Jr. | 709/230 |
| 2002/0016843 | A1 | 2/2002 | Schweitzer, et al. | |

* cited by examiner

*Primary Examiner*—Haresh N Patel
(74) *Attorney, Agent, or Firm*—John F. Letchford; Archer & Greiner, P.C.

(57) ABSTRACT

A method of monitoring a computer application executed on a computer system. The method includes the steps of (1) without predefining events describing potential stages of a transaction executed by the computer application, using an application program interface to add software code to the computer application for assigning a single general reference to characteristic transactional information associated with the transaction, (2) using the single general reference to identify transaction events performed by the computer application in executing the transaction, and (3) measuring transaction events.

5 Claims, 7 Drawing Sheets

COMPUTER SYSTEM PERFORMANCE MONITORING USING TRANSACTION LATENCY DATA

CROSS-REFERENCE TO RELATED APPLICATION

This application is a Continuation of U.S. patent application Ser. No. 09/896,854, now U.S. Pat. No. 7,051,339, filed Jun. 29, 2001.

FIELD OF THE INVENTION

The present invention relates in general to systems and methods for monitoring the performance of computer systems and, in particular, to computer system performance monitoring using transaction latency data.

BACKGROUND OF THE INVENTION

Measurement and management of computer systems performance is becoming increasingly important in businesses and industries that rely heavily on information technology (IT). The financial services industry, for example, is comprised of investment houses, banks, stock exchanges, brokers, and others who conduct countless computerized transactions on a daily basis and whose capital investments in technology may be tremendous. It is imperative, therefore, that participants in this or other information-dependent industries possess not only high-powered computer systems capable of handling high volumes of computerized transactions, but also that those systems function as nearly as possible to peak efficiency.

The concept of latency is often used a gauge of computer system and network performance. In a computer system or network, latency is the total time between two measurable points and is often used to mean any delay that increases real or perceived response time. This time may include the time it takes a message to be sent between processes or business offices over the network. It may also include the time spent in writing details or data to a disk or database. Other contributors to latency include processing/calculation delays, mismatches in data speed between the microprocessor and input/output (I/O) devices and inadequate data buffer, propagation (the time it takes for a packet to travel between one place and another); transmission medium (optical fiber, wireless, or some other medium); packet size; router and other processing (each gateway node takes time to examine and possibly change the header in a packet); and other computer and storage delays (e.g., within local area networks (LANS) or similar networks at each end of the journey, a packet may be subject to storage and hard disk access delays at intermediate devices such as switch and bridge).

A currently available IT performance optimization standard is application response measurement (ARM). ARM is a specification that details application response measurement and is provided as part of a software developer's kit that is available from various vendors including the Computer Measurement Group (CMG) headquartered in Turnersville, N.J. CMG and its members are concerned with measurement and management of computer systems, including performance evaluation of existing computer systems to maximize their performance (e.g., response time, throughput, etc.) and capacity management when enhancements to existing systems are planned and when new systems are being designed. The ARM specification is supported by commercial software available from Hewlett Packard Co. of Palo Alto, Calif., Tivoli Systems, Inc. of Austin, Tex. and BMC Software, Inc. of Houston, Tex. The ARM program includes an application program interface (API) that can capture system measurement data. However, at each transfer of the measurement data from one component in a computer system to the next, a unique API-generated handle (or "correlator" or "identifier") is created and transferred to the next system component. Hence, if processing time or other transactional data is to be passed from a first server to a second server in a computer system, then a first unique handle is generated by the ARM API that is correlated or associated with the transactional data, and the first handle and its associated transactional data are then passed from the first server to the second server. Likewise, if processing time or other transactional data is to be passed from the second server to a third server in the computer system, then a second unique handle is generated by the ARM API that is correlated or associated with the transactional data, and the second handle and its associated transactional data are then passed from the second server to the third server. In large systems that process a complex transaction comprised of many subtransactions, it becomes readily apparent that many unique API-generated handles must be created and passed through the system. Creating and passing multiple API-generated handles throughout a computer system requires that that the ARM API include a correlation application or program for tracking and correlating the processing time and other transactional data with the various handles as they through the computer system. Such an arrangement complicates the ARM API architecture and adds additional processing and storage burdens and other operational inefficiencies to the computer system whose latency characteristics the ARM API is intended to monitor. Moreover, the ARM API can only provide for the measurement of nested transactions that are client-server in nature, i.e., with a parent-child relationship.

Alternative systems and methods for monitoring computer system latency are disclosed in U.S. Pat. Nos. 6,041,352; 6,144,961 and 6,108,700.

U.S. Pat. No. 6,041,352 teaches a response time measuring system similar to conventional ARM. Conventional ARM determines system response time at the point of origin of a transaction request, i.e., when a transaction starts and when it completes from the perspective of the client. The system disclosed in U.S. Pat. No. 6,041,352 differs form conventional ARM in that it determines system response time at any point in the outgoing and incoming transaction path loop.

U.S. Pat. No. 6,144,961 describes a transaction response time measuring system that uses sampling of Open Systems Interconnection (OSI) data packets. In particular, when a user sends a transaction across a network, such as a data request for data stored on a server, data packets containing session layer data (OSI level 5 or greater) will travel across the network between the client and the server. When the transaction is complete and there are no other transactions currently pending between the client and the server, none of the data packets traveling between the client and the server will contain session layer data. In other words, packets containing session layer data only travel between the client and the server while the transaction between the client and the server is pending. U.S. Pat. No. 6,144,961 uses this fact to calculate the transaction response time in a non-intrusive manner.

To determine transaction response times, U.S. Pat. No. 6,144,961 uses a routine which analyzes captured data packets. The system captures data packets and then determines when the transaction in question begins. This is accomplished by detecting the initial presence of a data packet containing session layer data. The session layer data is detected by conventionally using the OSI model's description of the sequence of data information within each packet. Next, the routine detects an absence of session layer data contained within successive captured data packets for a predetermined amount of time. The routine then defines the end of the transaction as the point in time at which the predetermined amount of time began. The amount of time for processing the transaction is then measured as the difference between the beginning and the end of the transaction. Similar to the invention set forth in U.S. Pat. No. 6,041,352 and conventional ARM systems, the system and method provided in U.S. Pat. No. 6,144,961 offers a means to evaluate the response time associated with a particular user transaction request. Accordingly, like those technologies, it does not permit performance evaluation of a computer system comprised of a plurality of cooperating business units and/or processes.

U.S. Pat. No. 6,108,700 discloses a system for measuring the response times of the various stages of computer applications. The invention described therein proposes the creation of a transaction definition language called the ETE (End-to-End) Transaction Definition Language that specifies how to construct identifiable transactions from events and links. In an illustrated example, the ETE Transaction Definition Language provided in U.S. Pat. No. 6,108,700 requires the creation of twenty-one (21) lines of software code merely to define something as relatively simple as a Web commerce transaction. Merely contemplating all of the possible events and transactions that might be involved in a complex business transaction, particularly one whose execution involves the coordination of several business entities and computer systems, is itself a daunting task. Codifying these items complicates the task. That is, individually defining all of these events and transactions in software code in order to produce a complete set of transaction generation rules amounts to a potentially vast amount of preliminary preparation activity that must be performed before the monitoring system may be placed into operation.

An advantage exists, therefore, for a system and method of measuring the precise latency of information flowing through computer systems comprising multiple business units and/or or processes and regardless of system topology, e.g., nested client-server, distributed, or combinations thereof. The technique should be uncomplicated in design and implementation, minimally invasive, and highly scalable in order to accommodate potentially large volumes and frequencies of information flow through vast computer systems and networks.

SUMMARY OF THE INVENTION

The present invention provides a system for and method of measuring the precise latency of information flowing through computer systems and regardless of system topology, e.g., nested client-server, distributed, or a combinations thereof. As used in connection with the present invention, a "computer system" may include a single computer (including, without limitation, a mini-computer on up through a mainframe) as well the multiple processes running thereon, a plurality of computers interconnected in the form of a local area network (LAN), interconnected regional business offices, a wide area network (WAN), an international network of offices or the Internet. Similarly, a "transaction event" may include a request, a response, a directive not requiring a response, a complete or partially complete subtransaction, an automatically or manually triggered computer function, a database store or retrieve function or any other time-monitorable function or calculation that may be performed by a computer system.

The metrics measured by the present invention include the processing time for a given transaction event within each computing process, the time spent by the transaction between each computing process, and the time taken by the transaction to pass through the entire computer system. An exemplary, although not limitative, application of the present invention would involve precisely measuring the latency of business information flowing through a trading system comprising multiple processes running on multiple computers whereby trade data is passed from one process to the next with each new trade. Accordingly, the relevant metrics for that particular application of the invention would be the processing time for a given trade within each process, the time spent by the trade between each process, and the time taken by the trade to pass through any part of the system or the entire system.

The present invention involves the association of measurement or timing data with inherent transactional information that is ordinarily passed from one component of a computer system to the next in the course of executing a transaction by a computer application. The raw measurement or timing data is then used to calculate latency data for some or all aspects of a particular transaction. Significantly, the invention performs these operations based solely on references drawn only from the business or other transactional data associated with the transaction.

According to the invention, computer systems may be instrumented using an uncomplicated and minimally invasive API that allows the execution time of every task in an application to be measured and transactional information to be tagged to the measurement or timing data. Preferably, the measurement data is also associated with related measurement data from other components or systems of the same business entity in order to give precise latency data and statistics for transactions that involve more then one segment of a business' operations. By way of example, a trade reference or other inherent conventional business information normally associated with an electronic business transaction may be used as the transaction identifier throughout the latency measurement process. Then, individual tasks required for processing the task can be tagged with timing data whereby the data can be processed and evaluated to produce desired latency and/or summary data. For instance, the average, maximum or minimum time taken to process commodities or securities trades from front-office to back-office within a brokerage or investment house may be calculated with precision in order to obtain meaningful information concerning the efficiency of the business entity's computerized transaction system.

With the present invention, no special languages, software code and rules must be created to predefine and pre-classify events and transactions. Furthermore, no transaction handle or correlator needs to be created for a transaction and passed from one component of a computer system to the next since the business information normally associated with the transaction is itself sufficient to identify and track the transaction. Since no use is made of API-generated handles, the present system easier to deploy in modular systems than conventional ARM systems.

Moreover, multiple computer systems or components that may be required to execute an entire transaction need not be confined to being client-server in nature since the API according to the invention can be mapped to other topologies, e.g., a distributed system. The technique is simple in design and implementation, minimally invasive, and highly scalable in order to accommodate potentially large volumes and frequencies of information flow through vast computer systems and networks.

Among its advantages, the present system eliminates guess-work from computer system capacity estimates, enables ready assessment of the performance impact of new computer application releases and migrations, identifies application performance trends, works with either intra-system or inter-system IT system optimization tools, assists in researching user performance complaints and generates system management reports.

Other details, objects and advantages of the present invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments shown, by way of example only, in the accompanying drawings wherein.

DETAILED DESCRIPTION OF THE INVENTION

Figure 1:
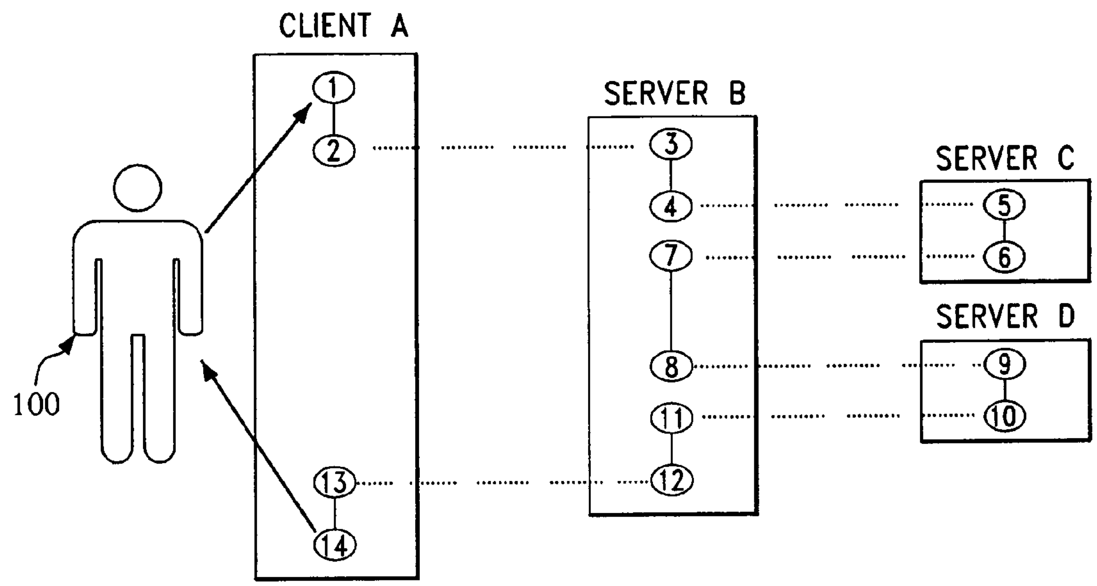
FIG. 1 is a schematic representation of a client-server computer system topology whose transactional latency may be measured by conventional IT performance optimization tools.

Referring to FIG. 1, there is shown a client-server computer system topology whose transactional latency may be measured by presently available IT performance optimization tools. In FIG. 1, Points 1 to 14 represent the flow of business or other transactional information through multiple transactions on multiple computers respectively named CLIENT A, SERVER B, SERVER C and SERVER D. The client-server topology represented in FIG. 1 is a nested parent-child type of topology wherein completed transaction 1/14 is comprised of a number of smaller nested transactions or subtransactions. Transaction 1/14 typically includes an initial transactional request made by user 100 (step 1) to a suitable computer input/output (I/O) device which culminates in the provision of the requested information from the I/O device to the user (step 14). Transaction 1/14 represents a transaction that is the parent of transaction 2/13, i.e., 2/13 is nested within 1/14. Transaction 2/13, in turn, is the parent of transaction 3/12, and so on. The latency of transaction 1/14 may be measured using a conventional IT performance optimization tool such as the ARM SDK described above.

Figure 2:
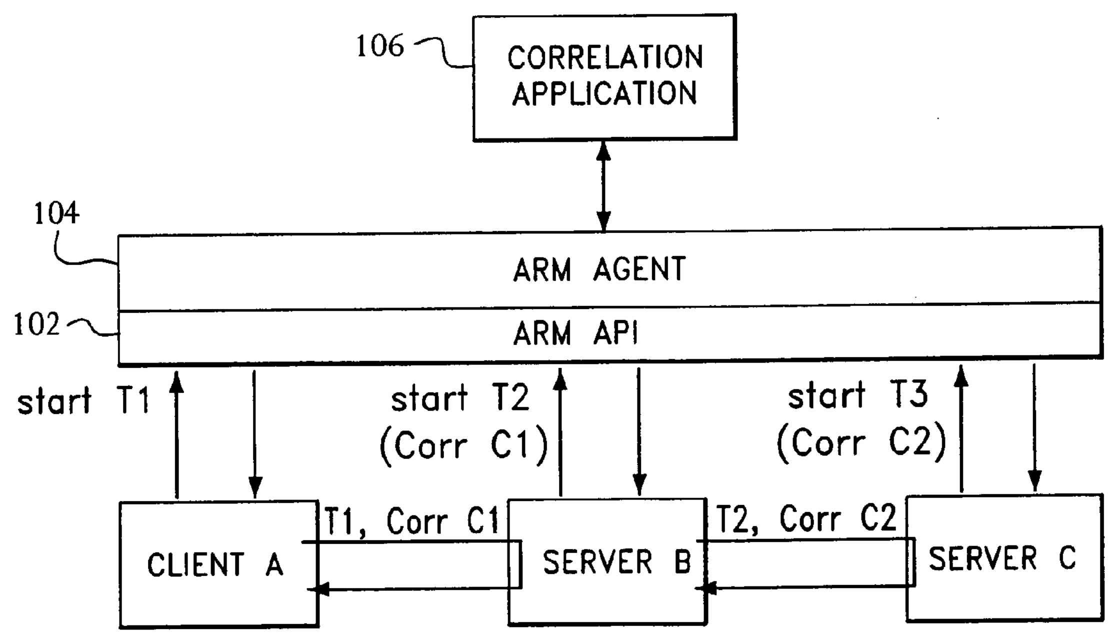
FIG. 2 is a schematic representation of how API-generated handles are created, correlated and tracked by conventional IT performance optimization tools measuring the transactional latency of the client-server computer system topology shown in FIG. 1.

FIG. 2 depicts the manner by which a conventional ARM program tracks flow of a simple completed transaction through CLIENT A, SERVER B and SERVER C of FIG. 1 to provide a breakdown of times across the nested transactions, i.e., the transaction time for 1/14 and the transaction time for 2/13 as part of 1/14, and so on. It will be understood that the principles reflected in FIG. 2 can be extended to an application, transaction and computer system of considerably greater complexity. A characteristic feature of conventional ARM programs is that an API-generated handle or "correlator" is created for each transaction occurring in a computer application. And, as discussed below, the handle changes once it is passed from system component to the next.

When a user makes a transactional request from an application being monitored by the ARM program, CLIENT A begins a first transaction T1 which initiates a START call to ARM API 102. An ARM START call typically identifies the application being monitored, the transaction and (optionally) the user, as well as the status of the transaction when completed. In the illustrated example, ARM API 102 also assigns the correlator or handle Corr C1 to the first transaction T1 and returns the handle to CLIENT A. Concurrently, through an ARM agent 104, the handle Corr C1 associated with the first transaction T1 is passed to a correlation application 106. In addition to communicating with the correlation application 106, ARM agent 104 measures and monitors the application transactions and may make the information available to IT management/optimization tools such as those offered by Cyrano SA of Newburyport, Mass.

Having received handle Corr C1 from ARM API 102 for the first transaction T1, CLIENT A sends a request (T1) to SERVER B, and includes handle Corr C1 in the request. SERVER B then starts a second transaction T2, passing Corr C1 as the parent handle or identifier for the second transaction to ARM API 102. At the same time, SERVER B requests and receives from ARM API 102 a correlator, Corr C2, which is assigned to the second transaction. Simultaneously, the handle Corr C2 associated with the second transaction T2 is passed to correlation application 106 through ARM agent 104. SERVER B then sends a request (T2) to SERVER C, and includes Corr C2 in the request. SERVER C starts transaction T3, passing Corr C2 as the parent handle or identifier for the third transaction to ARM API 102. In more complex applications and systems this cycle is repeated until the overall application transaction is completed. And, with each succeeding transaction request in the application or computer system, a new and different API-generated handle is created and passed with the request.

The correlation application 106 collects all the data about these transactions, and puts together the total picture, knowing that T1 is the parent of T2 (via C1), and T2 is the parent of T3 (via C2), and so forth. However, the creation, correlation and storage of potentially vast numbers of API-generated transaction handles needlessly complicates the transaction tracking process and consumes processing and storage resources that could be more productively allocated, e.g., to reducing the response time of the application being monitored.

Figure 3:
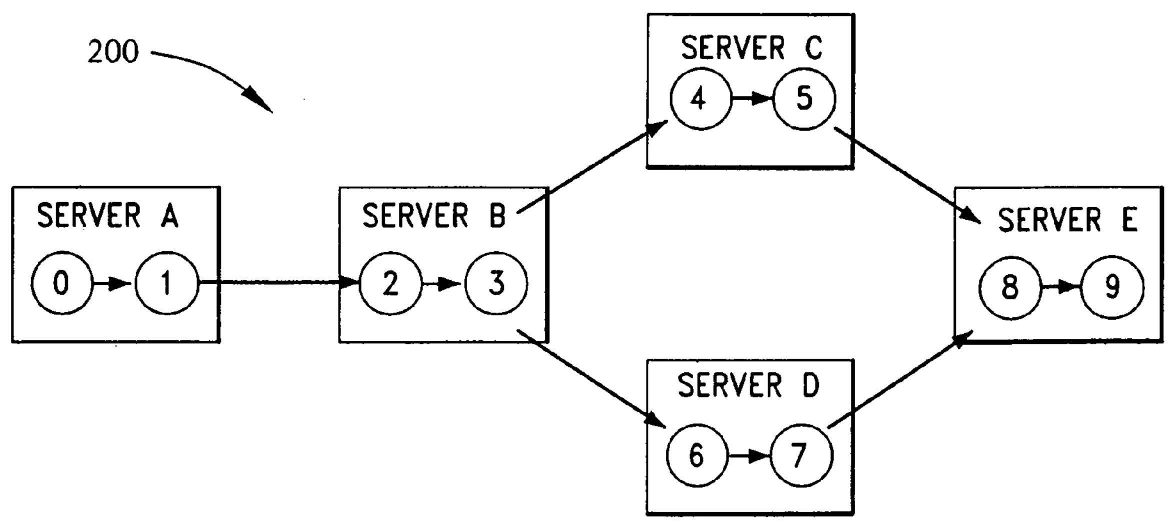
FIG. 3 is a schematic representation of a distributed computer system topology whose latency may be measured by the computer system performance monitoring system of the present invention.

Referring to FIG. 3, there is shown a distributed computer system 200, containing no nested transactions, whose latency may be measured by the computer system performance monitoring system of the present invention. Servers A through E represent a distributed computer system wherein business or other transactional information flows from point 0 to point 9 via either Server C or Server D. Unlike conventional ARM programs, the present computer system performance monitoring system is unrestricted in its ability to measure the time taken for transactional information to travel from point 0 to point 9 via Server C or Server D.

The present system measures the timing and calculates the precise latency of transactional information flowing through any computer system comprising multiple components, e.g., system 200 (or a nested or a combined nested and distributed topology system), by tagging or linking measurement data directly to the business or other transactional information being passed through the computer system. That is, unlike existing computer latency measuring systems, the present system employs no changing API-generated handles that are passed from server to server during operation of a computer application whose latency characteristics are being measured.

Figure 4:
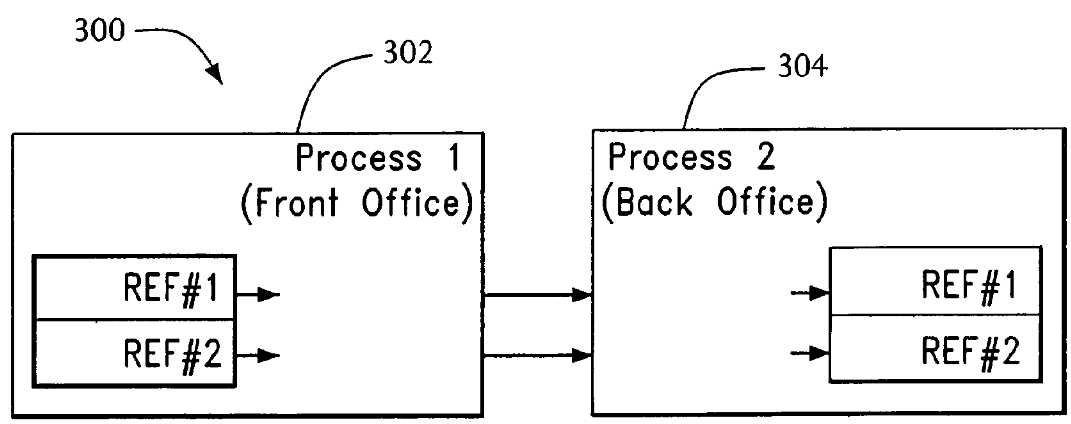
FIG. 4 is a schematic view of a simplified computer system whose latency may be measured using the computer system performance monitoring system of the present invention.

FIG. 4 is a schematic view of a simplified computer system whose latency may be measured using the computer system performance monitoring system of the present invention. The example shown in FIG. 4 represents a computer system that performs securities trade processing. However, its operational principles are applicable to all types of computer requests and transactions and may be extrapolated to model highly complex computer systems. The computer system, represented generally by reference numeral 300, comprises two components 302 and 304 whereby each component is a process (arbitrarily named front-office and back-office) through which two securities trades may be processed. Whether the trades are processed simultaneously or consecutively makes no difference to the outcome.

The API according to the present invention is placed strategically in a computer application to mark the beginning and end of processing (and any other significant events) at desired computer system components or processes, all of which are selected at the discretion of the user of the API. More specifically, API software code is added to the computer application which, when executed, assigns a single general reference to characteristic transactional information associated with a transaction event to be executed by the computer application. Additionally, the API includes an agent that marks the time at which the API software code is executed and tags that time with the business or other transactional information being currently processed by the computer application. Unlike conventional ARM APIs, the present API does not create or pass any data from one system component to the next (e.g., a timestamp or a unique API-generated handle, correlator or other identifier) beyond that of the business information ordinarily passed in processing a transaction. That is, the present invention recognizes that characteristic transactional information inherently associated with a given transaction, in and of itself, constitutes a readily identifiable electronic fingerprint or reference that is sufficient to enable identification and tracking of events processed by a computer application in executing the transaction as it flows through a computer system. For instance, characteristic business or other transactional information associated with a securities trade may include, inter alia, a Trade Identifier (or trade ID or trade reference, the identity of the party requesting the trade, the type of securities being traded, the number of securities being traded, the price of the securities, the date of the trade, whether the trade is a "buy" or a "sell", as well other trade-specific information. Thus, the aggregation of this characteristic transactional information represents a unique identifier that itself may be directly tracked throughout processing by a computer system, thereby eliminating the need for a new and different API-generated handle to be created, correlated and tracked at each transition from one computer system component to the next and for each computer application transaction conducted in executing the transaction.

Referring again to FIG. 4, using the API of the present invention, the following metrics are measured by the API agent: the time spent by each trade within Process 1; the time spent by each trade within Process 2; and the time spent by each trade between Processes 1 and 2. Each of two transaction processes (or computer components) has been instrumented with the API such that the beginning and end of processing will be logged and associated with the relevant trade reference, i.e., REF#1 and REF#2. The data produced by the API executed within each of the two processes 302, 304 may be summarized as follows (times are given as hh:mm:ss.SSS):

Process 1 (Front Office)
Business Tag: REF#1
Start Time: 09:49:51.143
End Time: 09:50:07.564
Business Tag: REF#2
Start Time: 09:50:15.387
End Time: 09:50:36.945

Process 2 (Back Office)
Business Tag: REF#1
Start Time: 09:50:25.676
End Time: 09:50:51.392
Business Tag: REF#2
Start Time: 09:50:59.190
End Time: 09:51:16.775

Latency Data Calculation:

According to the present invention, the data produced by the API can now be used to calculate the required metrics:

a) The time spent by each trade within Process 1 may be calculated by a component that subtracts the start time from the end time for each trade in Process 1:

Process 1:

$$\begin{aligned}\text{Trade } REF\#1\text{: time} &= REF\#1 \text{ end time} - REF\#1 \text{ start time}\\ &= 09{:}50{:}07.564 - 09{:}49{:}51.143\\ &= 16.421 \text{ seconds}\end{aligned}$$

$$\begin{aligned}\text{Trade } REF\#2\text{: time} &= REF\#2 \text{ end time} - REF\#2 \text{ start time}\\ &= 09{:}50{:}36.945 - 09{:}50{:}15.387\\ &= 21.558 \text{ seconds}\end{aligned}$$

b) Time spent by each trade within Process 2 may be calculated by a component that subtracts the start time from the end time for each trade in Process 2:

Process 2:

$$\text{Trade } REF\#1\text{: time} = REF\#1 \text{ end time} - REF\#1 \text{ start time}$$
$$= 09{:}50{:}51.392 - 09{:}50{:}25.676$$
$$= 25.716 \text{ seconds}$$

$$\text{Trade } REF\#2\text{: time} = REF\#2 \text{ end time} - REF\#2 \text{ start time}$$
$$= 09{:}51{:}16.775 - 09{:}50{:}59.190$$
$$= 17.585 \text{ seconds}$$

c) The time spent by each trade between Process 1 and Process 2 may be calculated by a component that correlates the available data by associating like business tags and subtracts the end time in Process 1 from the start time in Process 2:

$$\text{Trade } REF\#1\text{: time} = \text{process 2 start time} - \text{process 1 end time}$$
$$= 09{:}50{:}25.676 - 09{:}50{:}07.564$$
$$= 18.112 \text{ seconds}$$

$$\text{Trade } REF\#2\text{: time} = \text{process 2 start time} - \text{process 1 end time}$$
$$= 09{:}50{:}59.190 - 09{:}50{:}36.945$$
$$= 22.245 \text{ seconds}$$

In this simple example, general references REF#1 and REF#2 are used as tags to link the business or other transactional information they represent with measurement data created in both the front office and back office systems of a securities brokerage or the like. In a large-scale computer system, the software code of the API according to the invention might also assign component-specific references to the general transactional reference in order to track the same packet of characteristic transactional information as it passes from component to component. In the foregoing example, therefore, the same trade, e.g., Trade REF#1, might be referred to by reference REF#1/FO in the front office process 302 and REF#1/BO in the back office process 304. The API according to the present invention will correlate reference REF#1/FO with REF#1/BO as referring to the same trade without generating and tracking an entirely new handle or correlator at each component.

Figure 5:
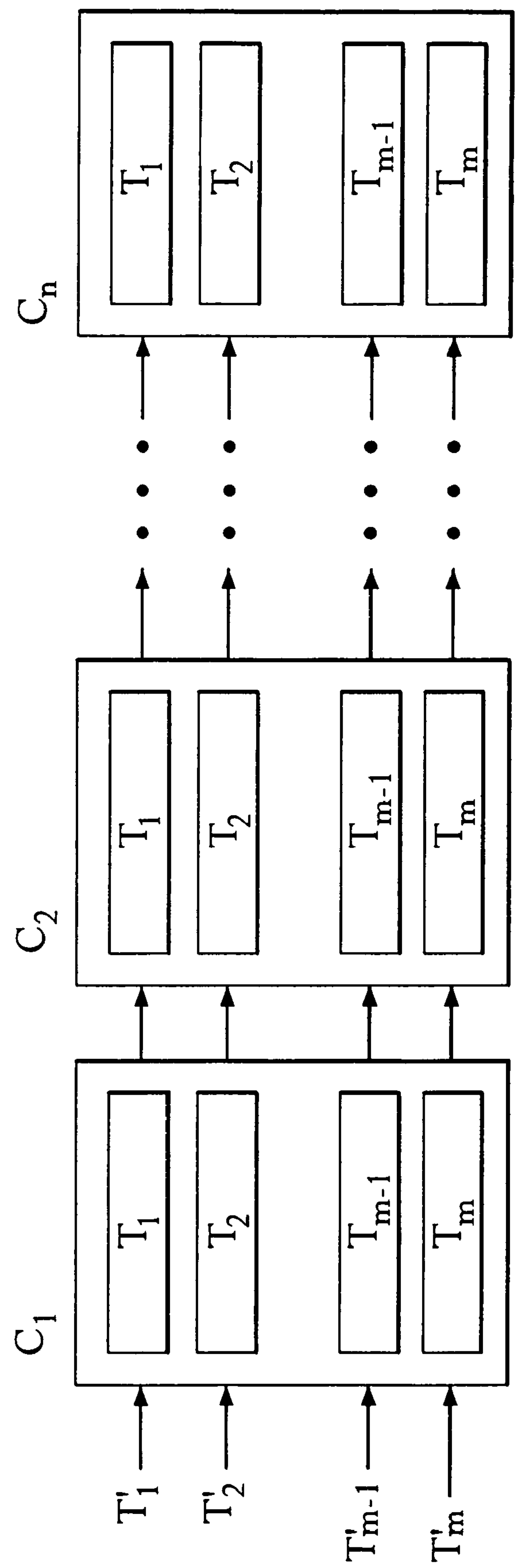
FIG. 5 symbolically represents the manner by which business or other transactional information flows through computer systems comprising multiple components.

FIG. 5 symbolically represents the manner by which business or other transactional information flows through computer systems comprising multiple components.

Consider the general example of a distributed computer system comprising a sequence of n number of independent computer system components ($C_1, C_2, \ldots, C_{n-1}, C_n$) connected via a network whereby the entire system processes m number of transaction events ($T_1, T_2, \ldots, T_{m-1}, T_m$) as business or other transactional information pertaining to each transaction event ($T'_1, T'_2, \ldots, T'_{m-1}, T'_m$) flows through the system. Transaction events are processed by each component in turn as business or other transactional information pertaining to each transaction event is passed from one component to the next.

Transaction event $T_1$ is first processed by component $C_1$ and business or other transactional information $T'_1$ is passed to component $C_2$; $T_1$ is then processed by $C_2$ and $T'_1$ is passed to $C_3$ and so forth until finally $T_1$ is processed by $C_n$. This process is repeated for $T_2$, $T_3$ and so on until finally $T_m$ is processed by the system. Whether transaction events $T_1$ to $T_m$ are processed simultaneously or consecutively does not affect the outcome of the ensuing calculations.

The API according to the present invention is placed strategically within each component such that it records the start times ($U_{C1}, U_{C2}, \ldots, U_{Cn-1}, U_{Cn}$) and end times ($V_{C1}, V_{C2}, \ldots, V_{Cn-1}, V_{Cn}$) for the processing of each transaction event within that component and tags those times with the business information pertaining to the transaction.

A representation of the data recorded as each transaction event $T_1$ to $T_m$ is processed by each component $C_1$ to $C_n$ as business or other transactional information $T'_1$ to $T'_m$ is passed from one component to the next is as follows:

$T'_1(U_{C1}), T'_1(V_{C1}),$
$T'_1(U_{C2}), T'_1(V_{C2}),$
$\ldots,$
$T'_1(U_{Cn}), T'_1(V_{Cn})$
$T'_2(U_{C1}), T'_2(V_{C1}),$
$T'_2(U_{C2}), T'_2(V_{C2}),$
$\ldots,$
$T'_2(U_{Cn}), T'_2(V_{Cn})$
$\ldots$
$T'_m(U_{C1}), T'_m(V_{C1}),$
$T'_m(U_{C2}), T'_m(V_{C2}),$
$\ldots,$
$T'_m(U_{Cn}), T'_m(V_{Cn})$ More generally, the data recorded at any given transaction event $T_x$ that is processed by any given component $C_y$ is:

$T'_x(U_{Cy}), T'_x(V_{Cy})$

Note that the above is purely a representation of the data recorded. The language and format of the data and the medium by which it is recorded is irrelevant to the outcome of the ensuing calculations.

Latency Data Calculations:

The association of like business or other transactional information in the data recorded by the API may now be used to calculate the following metrics:

a) The time spent by each component processing each transaction may be calculated by subtracting the start time from the end time for each transaction event within each component. For example, the processing time of transaction event $T_1$ by component $C_1$ may be calculated by sieving the recorded data for tag $T'_1$ and associating the relevant times found as follows:

$$T'_1(V_{C1}) - T'_1(U_{C1})$$

More generally, the processing time of transaction event $T_x$ by component $C_y$ is:

$$T'_x(V_{Cy}) - T'_x(U_{Cy})$$

b) The time spent by business or other transactional information between one component and another may be calculated by subtracting the end time for a transaction event being processed by a given component from the start time for a related transaction event in the other component. For example, the time spent by business information or other transactional $T'_1$ between components $C_1$ and $C_2$ may be calculated by sieving the recorded data for tag $T'_1$ and associating the relevant times found as follows:

$$T'_1(U_{C2}) - T'_1(V_{C1})$$

More generally, the time spent by business information $T'_x$ between $C_y$ and $C_z$ is:

$$T'_x(U_{Cz}) - T'_x(V_{Cy})$$

Aggregation Calculations:

The results of the above calculations may be used to produce statistics about a computer system, for example, the mean transaction time in each component, the mean latency of business information between components and maxima and minima amongst other statistics. To take a general example of latency between components, one might calculate the average latency of all business or transactional information passed between components $C_x$ and $C_y$ as follows:

$$\frac{(T_1'(U_{Cy}) - T_1'(V_{Cx})) + (T_2'(U_{Cy}) - T_2'(V_{Cx})) + \ldots + (T_{m-1}'(U_{Cy}) - T_{m-1}'(V_{Cx})) + (T_m'(U_{Cy}) - T_m'(V_{Cx}))}{m}$$

One might argue that if a statistical analysis of business information flow is all that is required (a potentially common scenario), a more appropriate technique might be to take an intermittent "sample" of a system and its current flows, i.e., intermittently record and tag transaction start and end times with business information, the rationale being a reduction in data and CPU requirement. However, the results would be inherently prone to error. Extreme times that occur between samples may fail to be recorded thus giving rise to incorrect maxima and minima. In addition, consider the general example of time spent by business information $T'_x$ between $C_y$ and $C_z$:

$$T'_x(U_{Cz}) - T'_x(V_{Cy})$$

Given that data is sampled from two independent components, namely $C_y$ and $C_z$, it cannot be guaranteed that for transaction $T_x$, both $T'_x(U_{Cy})$ and $T'_x(V_{Cz})$ will have been sampled and, accordingly, latency calculation is prevented (particularly as no assumption can be made about the order and concurrency of the processing of transactions, and particularly as the general example is extended to more complex topologies).

Various ARM-compliant systems gather the statistics about flows through a component of a computer system form intermittent samples and aggregate these results directly. The problem with this approach is that while it provides good statistics about the time transaction time taken within the individual modules or components it offers no indication of the latency between these components.

Most business flows in an organization or enterprise are interlinked. A downstream system may receive messages from many different locations. It is not possible to, for instance, just look at every 10th message and perform latency calculations for that message. This is so because it is nearly impossibly to reliably link the statistics gathered for that message in a first component with those gathered for the $10^{th}$ message in a second component because the. For example, the $10^{th}$ message in the first component may correspond to the $28^{th}$, $41^{st}$ or any other message in the second component.

The present invention enables precise measurements to be calculated for every piece of business or other transactional information flowing through a computer system. By comparison, the metrics gathered according to the present invention may be processed and analyzed to produce a statistical view of a system at a level of accuracy unattainable by monitoring systems that employ sample-based monitoring. Among other information, the present system may be used to determine any of number of precise time-based parameters of interest.

Figure 6:
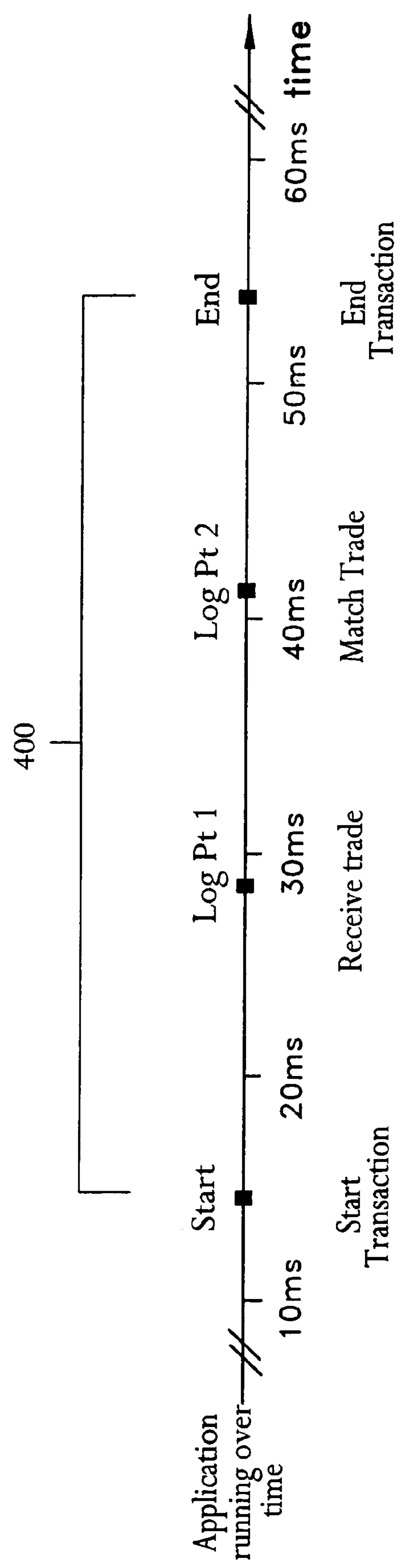
FIG. 6 is a view of a user-definable time frame for which the computer system performance monitoring system of the present invention may conduct timing measurements and latency calculations.

FIG. 6 is a view of a representative, although not limitative, user-definable time frame 400 for which the computer system performance monitoring system of the present invention may conduct timing measurements and latency data calculations. Time frame 400 is a logical unit of time and signifies the time required for an application to run from one specified point to another. Although illustrated within the context of a computer transaction in the form of a securities trade, frame 400 may be logically configured to instrument any computer application that conducts any business or other transaction. As well as having a start and end, frame 400 may also contain zero or more identified log points (e.g., Log Pt 1, Log Pt 2) that subdivide the frame into logical segments (e.g., Receive Trade and Match Trade). Further, using the API according to the invention, all points on frame 400 may be established at a user's discretion and may span multiple applications.

The instant API is a set of function calls that closely parallel the concept of the frame shown in FIG. 6 and may be placed strategically within application code. The API may be written in C, C++, Java or any presently available or hereinafter developed programming language that is compatible with the application to be monitored.

In operation, a computer system passes data from one application to the next and, hence, from one frame to the next. The function calls of the present API allow the passing of a transaction tag as a parameter (e.g., a trade reference number) which enables the transaction to be tracked frame by frame through multiple systems.

From an operational perspective, the present application monitoring system may be easily activated and deactivated as required. In the event of failure, the API has been designed and written so that there is no risk of the API taking down the component in which it is installed. If the API is unable to gather or record statistics, it automatically disables itself. For example, if statistics are being recorded to disk and the write returns a disk error, the API is disabled. However, the component will continue to process but no statistics will be recorded. Moreover, API function calls have a very low demand impact on the on the underlying application and typically add less than 0.5% overhead to a running application.

The monitoring system of the present invention can capture the following metrics:

processing rate through a computer system component;

frame failure rate, i.e., detection of whether a frame was started but not completed (reasons for failure may include a database commit failure and subsequent rollback or a trade marked for processing at a later time);

time spent in different modules of a component;

trends for different categories of transaction, e.g., Market=Paris versus Market=Milan;

times across multiple systems, e.g., booking to reporting;

patterns, e.g., daily peak saw-tooth, idle times enabling the user to identify good times for batch;

hitting capacity, e.g., trend to converge on known maximum test volume; and correlation with machine statistics, e.g., CPU, memory, network traffic and I/O.

Figure 7:
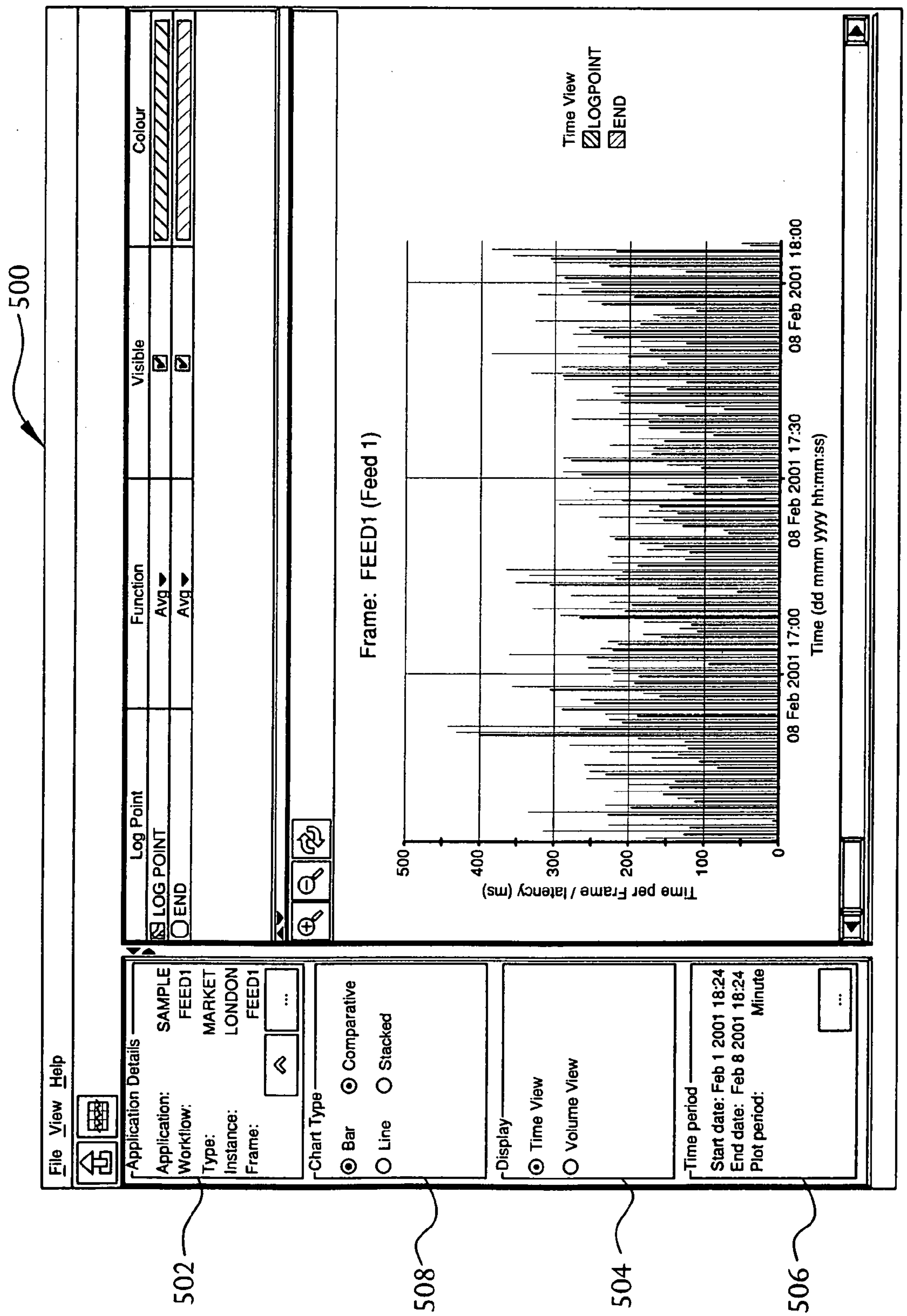
FIG. 7 is a window depicting a graphical user interface according to the present invention charting computer system latency data over a selected time frame.

FIG. 7 is a window depicting a graphical user interface (GUI) 500 according to the present invention charting computer system latency over a selected time frame. Region 502 of GUI 500 displays details of the application being monitored such as, for example, the application name, workflow (e.g., equity trades), type (e.g., by "market"), instance (e.g., NASDAQ), and frame. Other application details may be supported at the discretion of the user.

With GUI 500, a user may select at region 504 a "time view" or a "volume view" of the chosen time frame (the illustrated example depicts a time view plot of latency data within the chosen time frame). In a time view mode, GUI 500 permits a user to select at region 506 a time period for the frame under scrutiny, including the frame start and end dates, as well as the interval or plot periods within the frame. In the illustrated example, the selected plot period is one minute, although greater or lesser time plot intervals may be selected if desired or necessary. Region 508 allows a user to select a chart type for display, e.g., "bar" or "line" and, optionally, "comparative" or "stacked". In the illustrated example, a comparative bar chart is chosen and depicts a comparison, in bar format, of the average latencies of the frame at a selected log point within the frame (darker bars) and at the end of the frame (lighter bars).

In the particularly described example, all the statistical data is stored within a UDB database, although any database suitable for the purposes of the present invention would be acceptable. As noted, this data can be looked at using GUI 500. In addition, printed reports may be generated from the data. Other users may also load the data up into spreadsheets to analyze it. In the same way, data may be collected from processes by writing the data to file. Equally, the data could be sent to a socket instead of a file.

Figure 8:
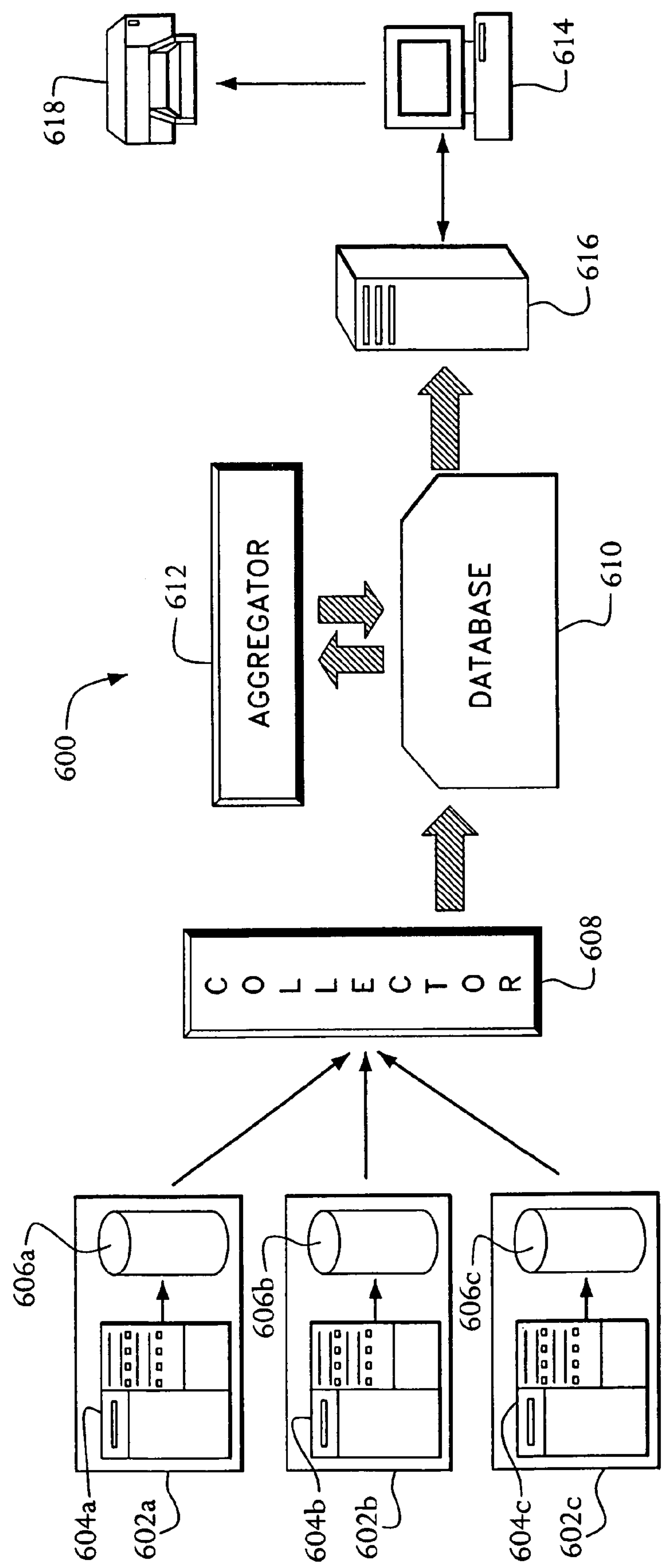
FIG. 8 is a schematic view of the architecture and technology of the computer system performance monitoring system of the present invention.

FIG. 8 is a schematic view of the architecture and technology of the computer system performance monitoring system of the present invention, which is identified generally by reference numeral 600. System 600 monitors one or more applications of production systems 602*a*, 602*b* and 602*c* that run on computer system servers 604*a*, 6004*b* and 604*c*. The lightweight API according to the present invention assigns a single general reference (and any component-specific references) to characteristic transactional information associated with a transaction request being executed by the computer applications. Additionally, the API agent logs transactional processing timing data to local file systems 606*a*, 606*b*, and 606*c*.

System 600 includes a collector 608 that reads file-based timing data logged at local file systems 606*a*, 606*b*, and 606*c* and loads it into a monitoring system database 610 via Java Database Connectivity (JDBC), Open Database Connectivity (ODBC) or other API specification compatible with the database. Although not limited thereto, because of its expansive functionalities and system compatibility, a presently preferred monitoring system database suitable for use in system 600 is the DB2 Universal Database (UDB) available from International Business Machines Corporation (IBM) of Armonk, N.Y. The IBM DB2 UDB runs on both IBM and non-IBM hardware supporting multiple operating systems including: Windows, AIX, Linux, Sun's Solaris Operating Environment, OS/2, HP-UX, NUMA-Q, OS/390, and AS/400. Monitoring system database 610 is the central storage area for raw and aggregated application timing data.

System 600 further includes an aggregator 612 that processes raw timing data produced by the API agent that is stored in monitoring system database 610 to calculate desired latency data and create summary data for a range of time periods (minute, hour, etc.). This processed information is likewise stored in monitoring system database 610 for retrieval by a user. In this connection, a GUI such as GUI 500 of FIG. 7 may be accessed by a user via a wired or wireless web access device 614 such as a personal computer, a laptop computer, a personal digital assistant or a cellular telephone. The GUI may be a Java or other application that may be run as a standalone application or as an applet within the context of a web browser. Using the GUI, the user make requests for information from monitoring system database 610 through a web server 616. Web server 616 is preferably a java-based remote method invocation (RMI) server which enables interaction between objects located on different computers in a distributed network and which has the ability to pass objects along with a request. Web server 616 may serve web pages and the aforementioned applet to the web access device 614 and a user may output desired information generated by the GUI to a printer or other output device 618.

The system further desirably includes an administration GUI to simplify setting up of workflows. Optionally, the system would desirably include modeling capabilities such as, for example, using the captured data and machine statistics to plot volume trends and to predict when existing system capacity will be exceeded and in which component(s).

Figure 9:
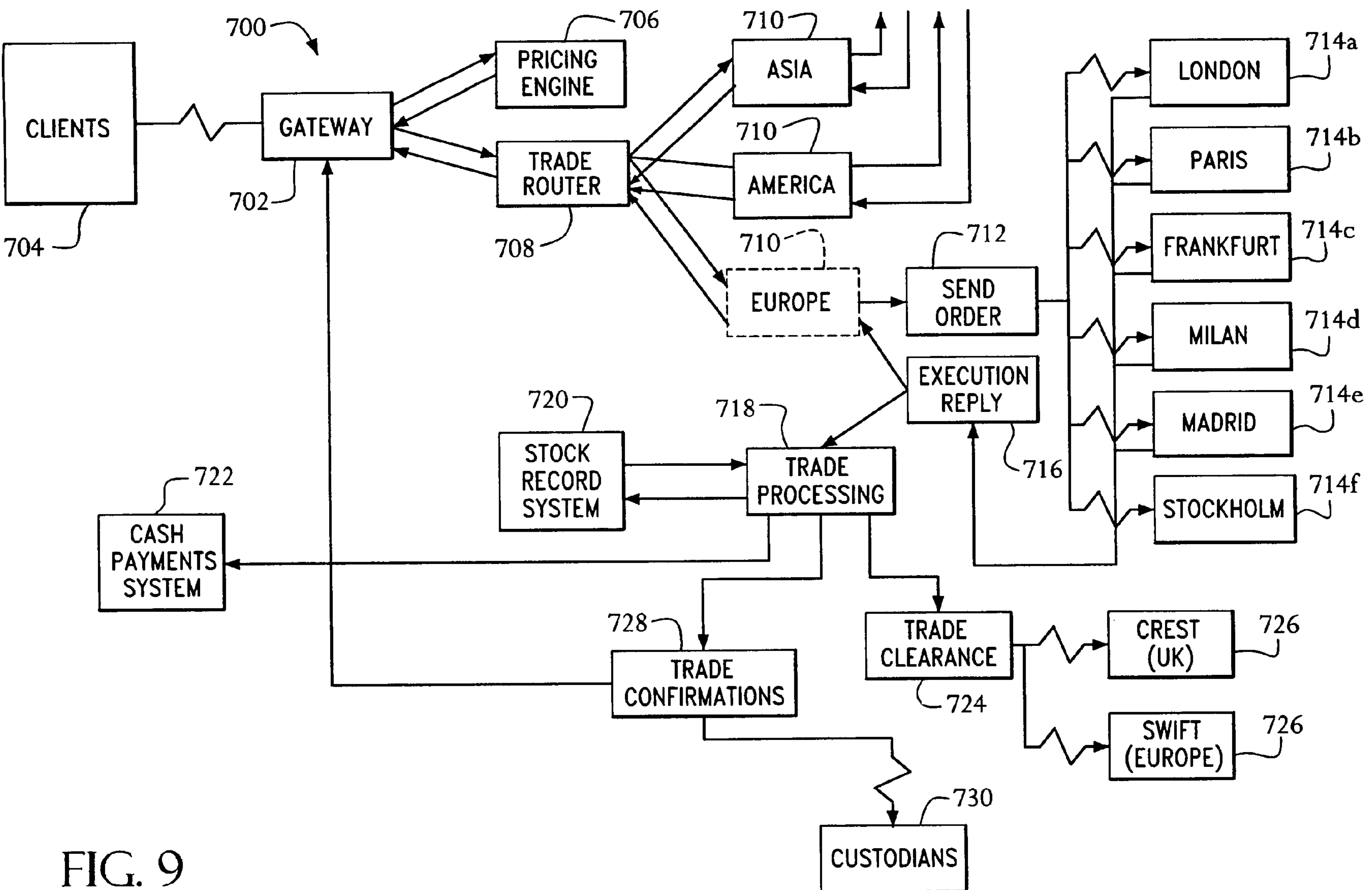
FIG. 9 is a schematic view of a globally dispersed computer system whose performance may be monitored using the computer system performance monitoring system of the present invention.

FIG. 9 is a schematic view of a globally-dispersed computer system 700 whose performance may be monitored using the computer system performance monitoring system of the present invention. Each of the boxes in FIG. 9 represents a component system of computer system 700. Computer system 700 is made up of a number of component systems which may or may not be similar to that shown in FIG. 2. Each component system of computer system 700 is made up of one or more processes. In addition, each component system will have its own database and will use some transport mechanism to send the business or other transactional data to the next system in the flow.

As indicated previously, the present invention is concerned with the time it takes transaction 'events' to occur in a computer system. Computer system 700, for example, is illustrative of merely one of many complex computer systems whose performance may be monitored by the system and method according to the invention. In particular, computer system 700 is a globally distributed computer system a bank, brokerage, investment house or other similar entity which runs an integrated computer application for enabling placement, processing and settlement of equities and other securities trades.

Computer system 700 comprises a gateway 702 through which clients 704 may initiate transactions such as trade orders or the like. In placing a trade order or simply requesting a current price for equity stocks or other securities, system 700 may provide a client with the desired price via a Pricing Engine 706. If the price is satisfactory to the client, then the client might place a trade order for the securities through a trade router 708 which, in turn, routes the request to the appropriate regional office 710 (e.g., Asia, America, Europe) of the investment entity. From the appropriate regional office 710, a Send Order request is distributed to the appropriate one or more exchanges 714*a*-714*f* capable of fulfilling the trade order. Each of the relevant ones of exchanges 714*a*-714*f* responds with its ability to execute the trade order via an Execution Reply 716 which is returned to the appropriate regional office 710. At this juncture, the regional office may convey the ability of the trade order to be fulfilled back to the client 704 and await confirmation from the client that the order is to be fulfilled. Alternatively, the regional office may execute the trade order according to previously agreed upon instructions established by the client.

Once authorization to execute the trade order has been given, the trade is processed at Trade Processing stage 718 which communicates a Stock Record System 720 which records the existence and pertinent details of the transaction. Additionally, Trade Processing stage 718 communicates with a cash Payments System 722 to secure payment for the transaction and seeks clearance for settlement of the trade through Trade Clearance stage 724. Depending on the geographic location of the regional office 710 through which the trade is executed, the trade clearance stage may involve obtaining clearance by one or more settlement systems 726 (e.g., CREST for settlement of UK, Irish and international securities and Society for Worldwide Interbank Financial Telecommunication "SWIFT" for settlement of European and international securities). With the appropriate clearances obtained, Trade Processing stage 718 communicates the cleared trades to Trade Confirmation stage 728 which, in turn, notifies investment Custodians 730 and the client 704 (through Gateway 702).

In analysing computer system 700 it may be important to know, among other information, how long it takes an trade order from a client 704 to be sent to the market. In FIG. 9, this would be the time from the Gateway 702 to Send Order 712 to markets 714*a*-714*f*. With the present invention, this and any other desired business flow in computer system 700 may be broken down in such a way that one can observe how long it takes within each process en-route and the time taken between each process.

Recall that in conventional ARM-type computer system monitoring, an API-generated handle is created that is then used to reference each logging action. This handle is passed downstream to another process that supplies the first handle to the ARM agent and is then given a replacement handle that establishes the link between the first process and the second. This link is continued through any linked processes.

In the present invention, there is no handle-generating API agent or correlation application for correlating the API-generated handles with the transaction being processed. This is because the only data passed between processes is business or other transactional data and the only data supplied to the instant collection agent is that data. This data, e.g. a Trade Identifier, is used to link the processes together throughout computer system 700.

The advantage of this method is that there is no requirement for the processes to pass a handle between them. The following hypothetical is illustrative. Assume, for instance, that there are four processes involved in a particular transactional flow. If, as in the present example, each of these processes uses the same reference to identify a trade being processed, the present invention will enable monitoring of the flow if only process 1 and process 4 were logged. Since the trade being monitored shares the same reference throughout the business flow one could determine the start time for process 1 and the end time for process 4. To perform corresponding monitoring of the same trade with the ARM standard, an external handle would need to be made available and this would entail the data links between process 1 and 2, 2 and 3, and 3 and 4 being changed at each link.

It is not uncommon for one or more of the processes in the flow to be a package supplied by an external vendor. Under those circumstances, statistics about the time taken within the external package cannot be gathered. However, using the present computer system monitoring system, the presence of an externally controlled package would not negate the ability to consider the total time taken within the flow or within the individual components not under third party control. An example of this provided in FIG. 9 wherein orders are sent to a number of exchanges. A Trade Identifier cannot be sent out from Send Order 712 to the exchanges 714. However, this does not impact the ability of the present system to link Send Order 712 and Execution Reply 716 together by the business or other transactional data associated with the trade. In this way, the present system can calculate how long the trade took being sent to and sent back from the exchanges. This is extremely important in understanding where the latency within the flow is occurring. If, for example, excessive latency was manifested between Send Order 712 and Execution Reply 716, it might indicate that the enterprise needs to upgrade links, etc.

A further advantage of the present invention is that business or other transactional data collected from a process may be used within a number of transactional flows under scrutiny. Referring again to FIG. 9, consider the flow path that routes data from Gateway 702, Trade Router 708, the European regional office 710, Send Order 712, European regional office 710, Trade Router 708 to Gateway 702. This flow would equate to the total round trip time for a trade event from and to the client 704. Likewise, the data collected from Gateway 702, Trade Router 708, European regional office 710, Send Order 712 to European regional office 710 is also used in the flow that feeds through to Trade Processing 718 and beyond that to Stock Record system 720, Cash Payments System 722, Trade Confirmations 728 and so on. This is of particular importance since many complex and geographically-dispersed computer systems are not normally limited to isolated flows. Most computer systems and components receive events passed from a number of other systems and, similarly, equally pass data to a number of downstream systems. Associating all of these events with common transactional data greatly simplifies tracking of the transaction within the computer system and evaluation of computer system's performance.

Although the invention has been described in detail for the purpose of illustration, it is to be understood that such detail is solely for that purpose and that variations can be made therein by those skilled in the art without departing from the spirit and scope of the invention as claimed herein.

What is claimed is:

1. A method of monitoring a computer application executed on a computer system, said method comprising the steps of:

without predefining events describing potential stages of a transaction to be executed by said computer application, using an application program interface to add software code to said computer application for assigning a single general reference to characteristic transactional information associated with said transaction;

using said single general reference to identify transaction events performed by said computer application in executing said transaction;

measuring transaction events, wherein said step of measuring transaction events comprises measuring processing time spent by said computer application at each component of said computer system and measuring processing time spent by said computer application between each component of said computer system; and charting latency of said computer system over a selected time frame.

2. The method of claim 1 further comprising assigning a component-specific reference to said single general reference at each component of said computer system, said component-specific reference representing said characteristic transactional information as said computer application is executed on said computer system.

3. The method of claim 1 further comprising calculating latency of transactional information passed between components of said computer system according to the formula:

$$\frac{(T'_1(U_{Cy}) - T'_1(V_{Cx})) + (T'_2(U_{Cy}) - T'_2(V_{Cx})) + \ldots + (T'_{m-1}(U_{Cy}) - T'_{m-1}(V_{Cx})) + (T'_m(U_{Cy}) - T'_m(V_{Cx}))}{m}$$

where:

m=an unspecified number of transaction events, $T_1, T_2, \ldots, T_{m-1}, T_m$;

$T'_1, T'_2, \ldots, T'_{m-1}, T'_m$=transactional information pertaining to transaction events, $T_1, T_2, \ldots, T_{m-1}, T_m$;

$U_{Cy}$=start time for a transaction event at one component of said computer system; and $V_{Cx}$=end time for a transaction event at another component of said computer system.

4. An application program interface for use in monitoring a computer application executed on a computer system comprised of at least one component, said application program interface comprising:

software code added to said computer application for assigning, without predefining events describing potential stages of a transaction to be executed by said computer application, a single general reference to characteristic transactional information associated with a transaction to be executed by said computer application; and an agent for marking a time at which said software code is executed and tagging that time with said characteristic transactional information as said characteristic transactional information is being currently processed by the computer application, for measuring the processing time spent by said computer application at each component of said computer system and for measuring the processing time spent by said computer application between each component of said computer system in order to chart latency of said computer system over a selected time frame.

5. The application program interface of claim 4 wherein said software code is further operable to assign a component-specific reference to said single general reference at each component of said computer system, said component-specific reference representing said characteristic transactional information as said computer application is executed on said computer system.

* * * * *